US012649225B2

(12) United States Patent
Hanlon

(10) Patent No.: US 12,649,225 B2
(45) Date of Patent: Jun. 9, 2026

(54) MODULAR, MULTI-RAIL SAWHORSE WITH PIVOTING LEGS

(71) Applicant: Perfect Site LLC, Las Vegas, NV (US)

(72) Inventor: Jared W. Hanlon, Las Vegas, NV (US)

(73) Assignee: Perfect Site, LLC, Las Vegas, NV (US)

(*) Notice: Subject to any disclaimer, the term of this patent is extended or adjusted under 35 U.S.C. 154(b) by 644 days.

(21) Appl. No.: 18/076,252

(22) Filed: Dec. 6, 2022

(65) Prior Publication Data

US 2024/0139932 A1 May 2, 2024

Related U.S. Application Data

(60) Provisional application No. 63/421,906, filed on Nov. 2, 2022, provisional application No. 63/286,980, filed on Dec. 7, 2021.

(51) Int. Cl.
*B25H 1/06* (2006.01)
*B25H 1/04* (2006.01)

(52) U.S. Cl.
CPC ................. *B25H 1/06* (2013.01); *B25H 1/04* (2013.01)

(58) Field of Classification Search
CPC .................................... B25H 1/04; B25H 1/06
USPC ........................................... 182/155; 108/127
See application file for complete search history.

(56) References Cited

U.S. PATENT DOCUMENTS

| | | | | |
|---|---|---|---|---|
| 2,594,464 A * | 4/1952 | Loucks, Jr. | B25H 1/06 | 403/100 |
| 4,884,658 A * | 12/1989 | Banfield | B25H 1/06 | 182/155 |
| 5,105,862 A | 4/1992 | Skinner et al. | | |
| 5,836,365 A | 11/1998 | Derecktor | | |
| 5,960,904 A | 10/1999 | Ullmann | | |
| D471,287 S | 3/2003 | Sommerville et al. | | |
| 6,681,895 B2 | 1/2004 | Virtue | | |
| D489,738 S | 5/2004 | Radermacher | | |
| 6,745,804 B2 | 6/2004 | Welsh | | |
| 7,185,738 B1 | 3/2007 | Clepper | | |
| 7,210,510 B2 | 5/2007 | Barclay deTolly | | |
| 7,222,648 B2 | 5/2007 | Liu et al. | | |
| D549,749 S | 8/2007 | Francis et al. | | |
| D584,421 S | 1/2009 | Wise | | |
| 7,481,254 B2 | 1/2009 | Welsh et al. | | |
| 8,528,870 B2 | 9/2013 | Liu et al. | | |
| 8,684,052 B2 | 4/2014 | Breitenbach | | |
| 9,221,168 B2 | 12/2015 | Boyd | | |

(Continued)

FOREIGN PATENT DOCUMENTS

| | | |
|---|---|---|
| CN | 301699077 | 10/2011 |
| CN | 302685948 | 12/2013 |

(Continued)

*Primary Examiner* — Brian D Mattei
(74) *Attorney, Agent, or Firm* — Snell & Wilmer, LLP

(57) ABSTRACT

A sawhorse is provided. The sawhorse has a body. The body includes a first end support, a second end support, and a plurality of rails extending between the first and second end supports. The sawhorse also includes a first pair of hinged legs pivotally connected to the body, and a second pair of hinged legs pivotally connected to the body. The first pair of hinged legs and the second pair of hinged legs are each configured to move from a stowed position to an extended position, with respect to the body.

14 Claims, 14 Drawing Sheets

(56) References Cited

U.S. PATENT DOCUMENTS

| | | | | |
|---|---|---|---|---|
| 9,302,288 | B2 | 4/2016 | Waterston | |
| 9,557,000 | B2 | 1/2017 | Chang | |
| 10,093,017 | B2 | 10/2018 | Bimbaum | |
| D842,015 | S | 3/2019 | Strempke et al. | |
| 10,252,410 | B2 | 4/2019 | Luis y Prado | |
| D872,877 | S | 1/2020 | Hanlon | |
| D882,824 | S | 4/2020 | Hanlon | |
| D899,629 | S | 10/2020 | Hanlon | |
| 10,864,625 | B2 | 12/2020 | Hanlon | |
| 11,648,659 | B2 | 5/2023 | Hanlon | |
| 2004/0124036 | A1 | 7/2004 | Carl, Jr. | |
| 2006/0226311 | A1 | 10/2006 | Radermacher | |
| 2009/0084929 | A1* | 4/2009 | Bergmann | B23D 47/02 248/676 |
| 2010/0107838 | A1 | 5/2010 | Berg | |
| 2010/0288585 | A1 | 11/2010 | Katz et al. | |
| 2014/0182443 | A1 | 7/2014 | Bokelaar | |
| 2019/0168374 | A1* | 6/2019 | Hanlon | B25H 1/04 |
| 2021/0107133 | A1* | 4/2021 | Hanlon | B25H 1/14 |
| 2022/0055203 | A1* | 2/2022 | Omry | B25H 1/06 |
| 2022/0126478 | A1 | 4/2022 | Garness | |
| 2022/0314427 | A1 | 10/2022 | Hanlon | |

FOREIGN PATENT DOCUMENTS

| | | |
|---|---|---|
| CN | 303660132 | 5/2016 |
| CN | 306111150 | 10/2020 |

* cited by examiner

MODULAR, MULTI-RAIL SAWHORSE WITH PIVOTING LEGS

RELATED APPLICATION DATA

This application claims priority to U.S. Provisional Application Ser. No. 62/286,980, filed Dec. 7, 2021, and U.S. Provisional Application Ser. No. 63/421,906, filed Nov. 3, 2022, and incorporates by reference said application as if set forth fully herein.

FIELD OF THE INVENTION

The present invention relates to workpiece supports such as stands and sawhorses.

BACKGROUND OF THE INVENTION

Sawhorses are often used to support workpieces, tools and the like. However, many sawhorse designs occupy a lot of space, particularly when being shipped and/or stored. Further, many existing sawhorses are heavy, making them expensive to transport and difficult to move.

Accordingly, it is with respect to these and other considerations that the disclosure made herein is presented.

SUMMARY OF THE INVENTION

One aspect of the invention is a workpiece and/or tool support, such as a sawhorse.

In one embodiment, the sawhorse has a body. The body includes a first end support, a second end support, and a plurality of rails extending between the first and second end supports. The sawhorse also includes a first pair of hinged legs pivotally connected to the body, and a second pair of hinged legs pivotally connected to the body. The first pair of hinged legs and the second pair of hinged legs are each configured to move from a stowed position to an extended position, with respect to the body.

In another embodiment, the sawhorse has a body including a first end support, a second end support, a central support disposed between the first and second end supports, and a plurality of rails. The sawhorse also includes a first pair of legs pivotally connected to the body, and a second pair of legs pivotally connected to the body. The plurality of rails includes a first plurality of rails extending between the first end support and the central support, and a second plurality of rails extending between the second end support and the central support.

Further objects, features, and advantages of the present invention over the prior art will become apparent from the detailed description of the drawings which follows, when considered with the attached figures.

DESCRIPTION OF THE DRAWINGS

The detailed description is set forth with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

DETAILED DESCRIPTION OF THE INVENTION

In the following description, numerous specific details are set forth in order to provide a more thorough description of the present invention. It will be apparent, however, to one skilled in the art, that the present invention may be practiced without these specific details. In other instances, well-known features have not been described in detail so as not to obscure the invention.

One embodiment of the invention is support for workpieces, tools and the like. In one embodiment, the support may be referred to as a sawhorse.

Figure 1:
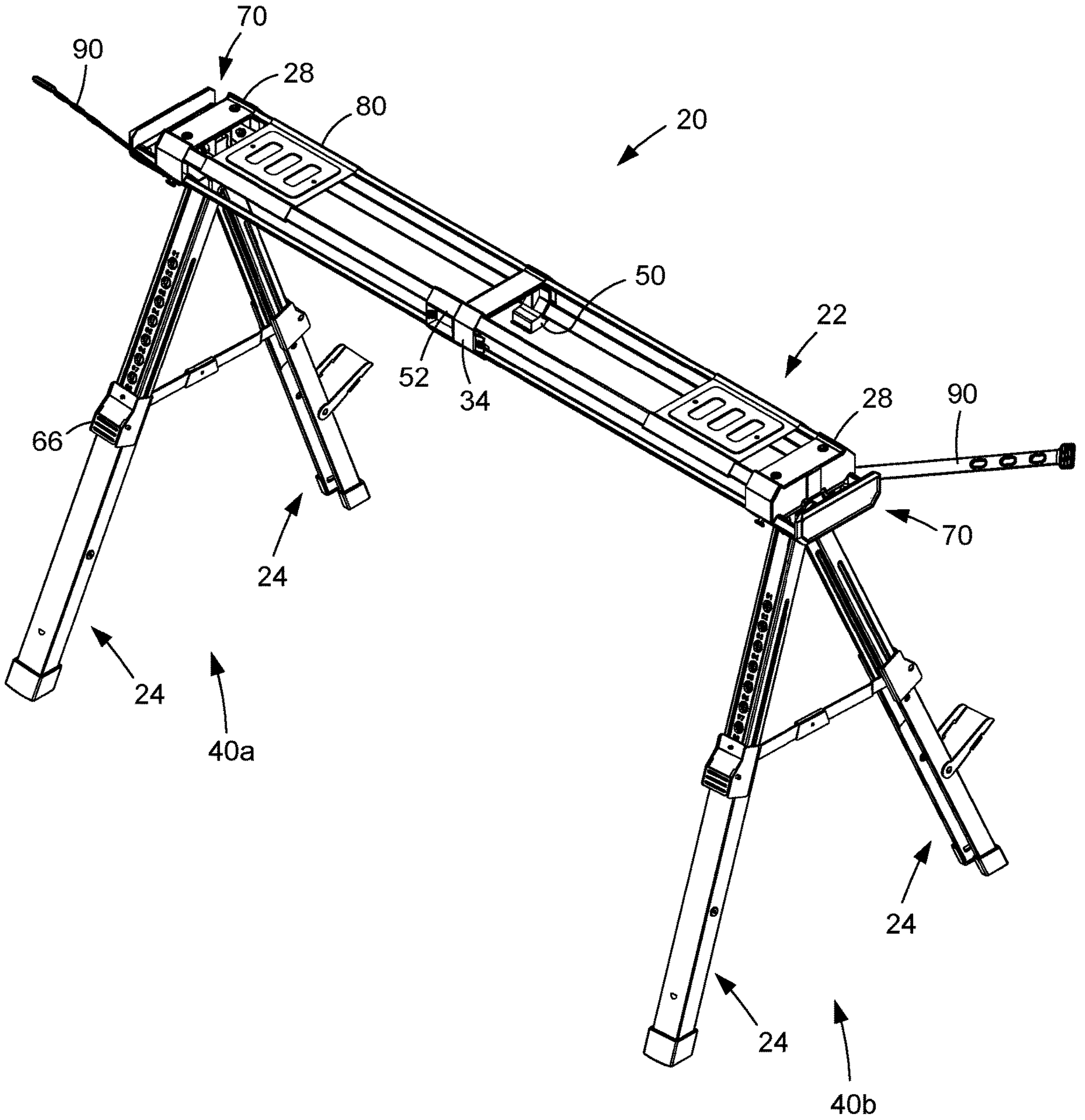
FIGS. 1, 2, 3, and 4 are front isometric, top plan, front, and side views of a sawhorse, respectively, in accordance with one non-limiting embodiment of the disclosed concept.
Figure 2:
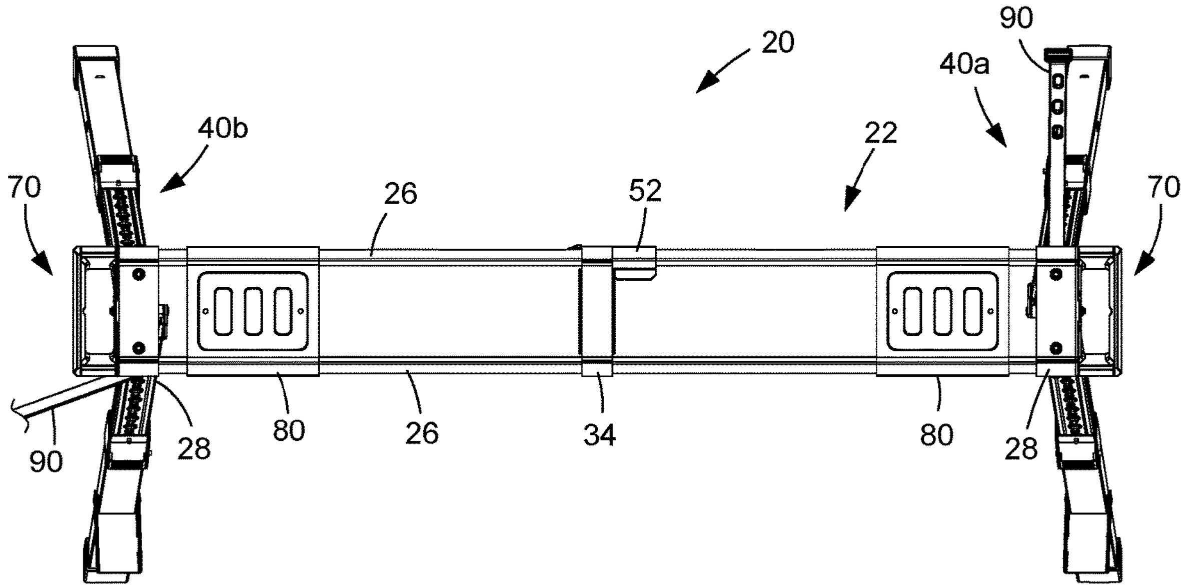

One embodiment of the invention will be described with reference to FIGS. 1-14. In general, in one embodiment as shown in FIGS. 1 and 2, a sawhorse 20 includes a body 22 which may be supposed by pairs of legs 40*a*, 40*b* which may be hingedly mounted to the body 22. The body 22 may comprise a plurality of spaced, elongate rails 26 which extend between end supports 28. Additionally, the sawhorse 20 may include a number of workpiece securing members, such as straps 90 coupled to the end supports 28 for securing workpieces to the sawhorse 20.

Figure 8:
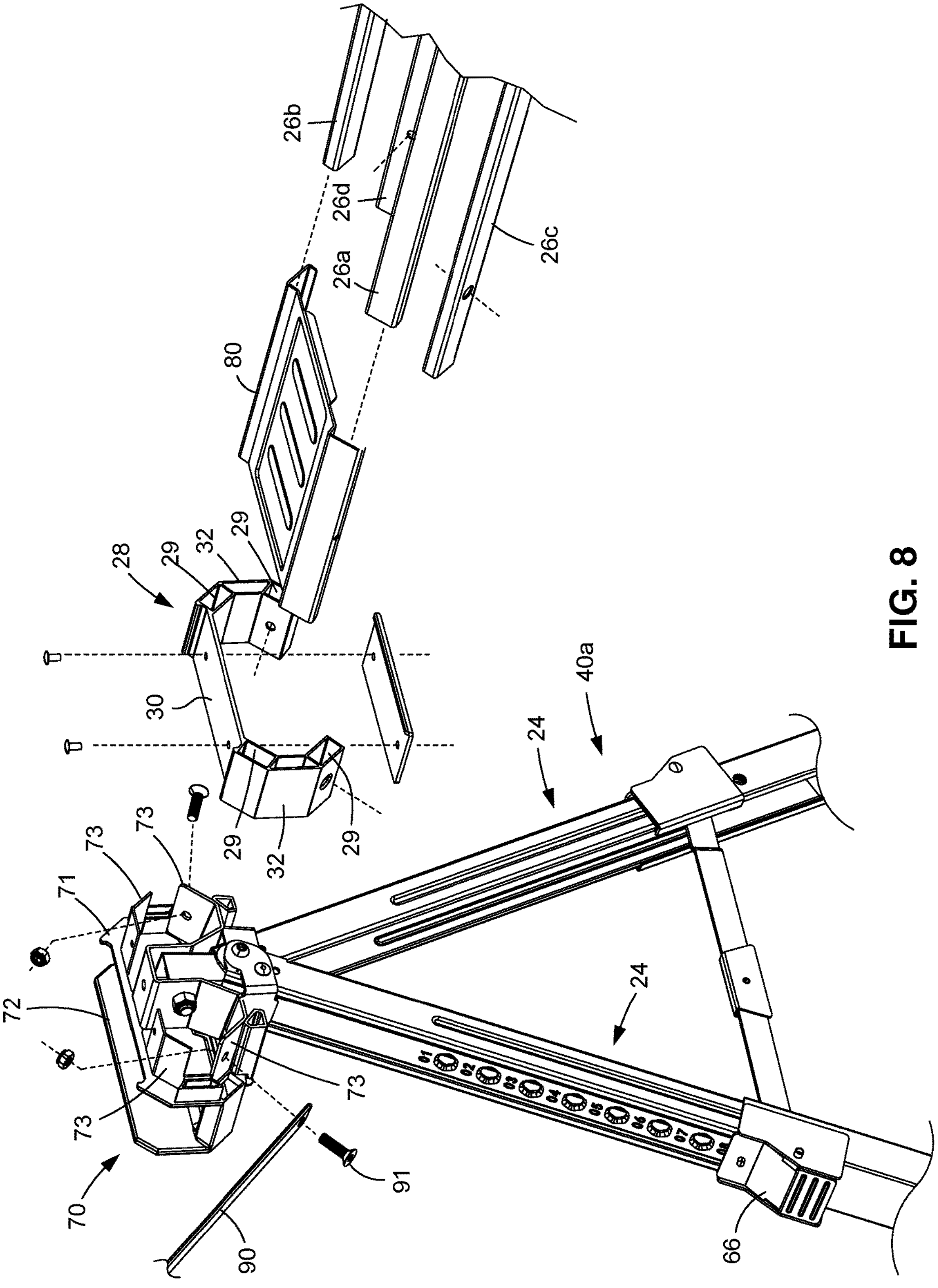
FIG. 8 is an exploded isometric view of a portion of the sawhorse of FIG. 7.
Figure 9:
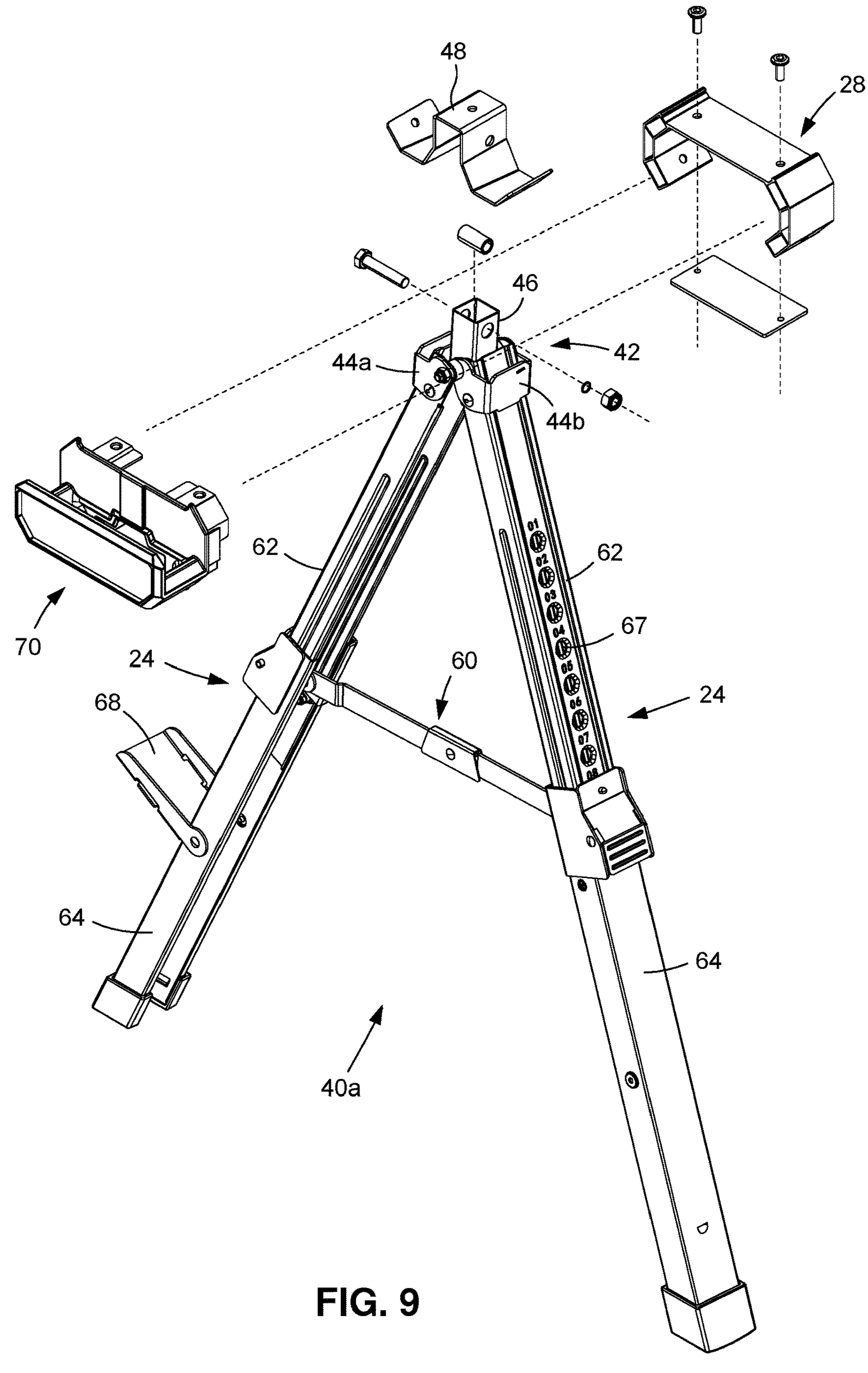
FIGS. 9 and 10 are different exploded isometric views of different portions of the sawhorse of FIG. 7.

The end supports 28 may, as shown in FIGS. 1-6, but as best illustrated in FIGS. 8 and 9, comprise generally C-shaped bodies, such as formed from extruded aluminum. The end supports 28 may define a central section 30 (which may be generally planar) and first and second rail mounts 32 at opposing ends of the central section. The rail mounts 32 may define one or more openings 29, or apertures, such as for receiving a portion of a rail 26 therein.

In one embodiment, the rails 26 extend between the end supports 28. In one embodiment, the rails 26 may directly extend between a pair of end supports 28 (e.g. where the ends of the rails 26 terminate at the end supports 28; although in other embodiments, the one or more of the rails might extend beyond the end support(s) 28). In other embodiments, a first set of rails 26 may extend between a first of the end supports and a central support 34 (or one or more intermediate supports), and one or more other sets of rails 26 may extend from the central support 34 to the second end support 28 (this allows, for example, for the sawhorse 20 to be broken into components of smaller dimensions, such as for shipping). This is discussed below in association with FIGS. 17-19. The central support 34 may be similar to (e.g., structured the same as) the end supports 28, such as having a central section and a pair of rail mounts, and where the central support 34 includes an extruded aluminum member. Thus, the length of the body 22 may vary, such as depending upon the lengths of the rails 26 and/or the number of rails 26 which are utilized.

Figure 7:
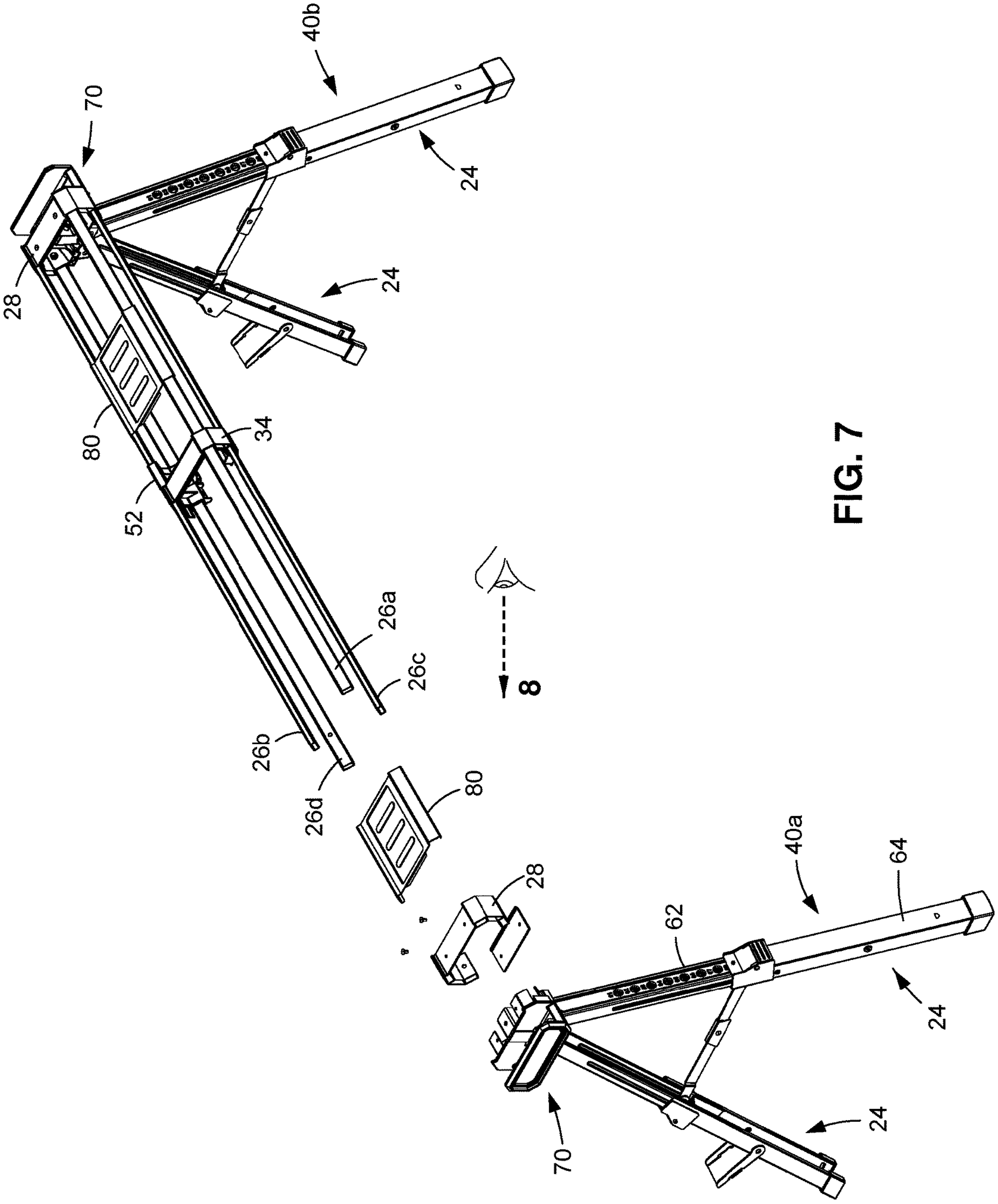
FIG. 7 is an exploded isometric view of the sawhorse of FIG. 6.

In one embodiment, the rails 26 comprise extruded members as well, such as tubular piping (so as to be lightweight). For example, the rails 26 may include generally square tubing of metal, fiberglass, etc. In one embodiment, the body 22 has first and second upper rails 26*a,b* and first and second lower rails 26*c,d*, such as illustrated in FIG. 7. The first and second upper rails 26*a,b* may be spaced apart to define a upper channel, and be generally coplanar with the top or central section 30 of the end supports 28. The first and second lower rails 26*c,d* may be located below the upper rails and may also be spaced apart from one another, such as to define a lower channel. The rails may generally define an interior space of the body 22 below a top of the body.

In one example, the lower rails 26*c*, 26*d* and the upper rails 26*a*, 26*b* extend between the first and second end supports 28 and define corresponding lower and upper channels. Additionally, it will be appreciated that each of the pair of lower rails 26*c*, 26*d* and the pair of upper rails 26*a*, 26*b* includes an end configured to be slid into a corresponding opening (e.g., openings 29 shown in FIG. 8) of a corresponding one of the first and second end supports 28. As such, the rails 26*a*, 26*b*, 26*c*, 26*d* extend through the openings 29 of each of the first and second end supports 28 in order to provide support to the first and second end supports 28. Accordingly, the rails 26 may be detachably connected to the end supports 28 and the central support 34. The ends might, in one example, then be fixed, such as with a fastener or the like. This allows the sawhorse 20 to be made from individual components of a small size which facilitates a small packing dimension for shipping and storage, but which allows the sawhorse 20 to be easily assembled for use (and, if desired, disassembled at a later time).

Figure 4:
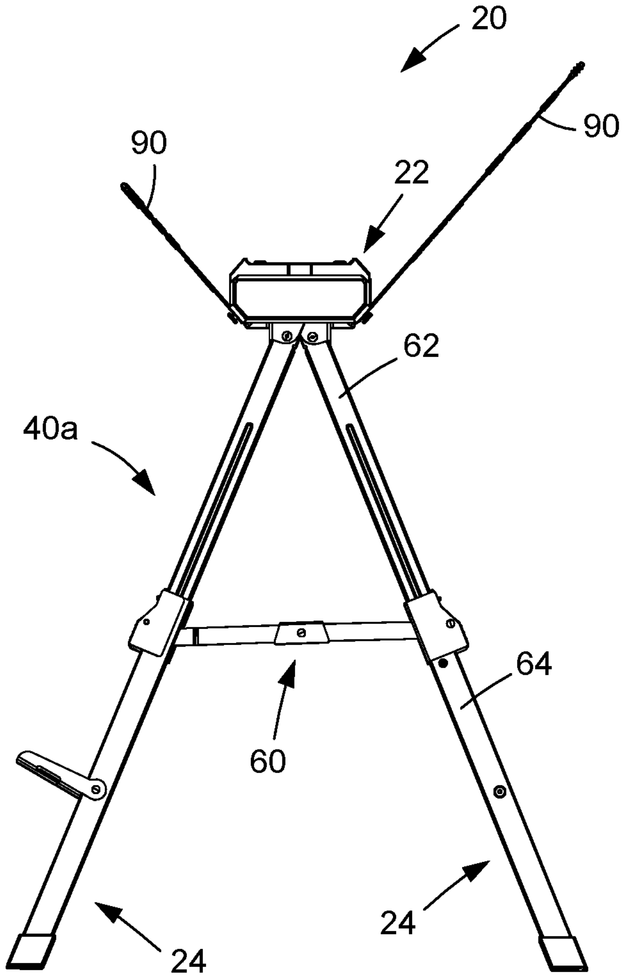
Figure 5:
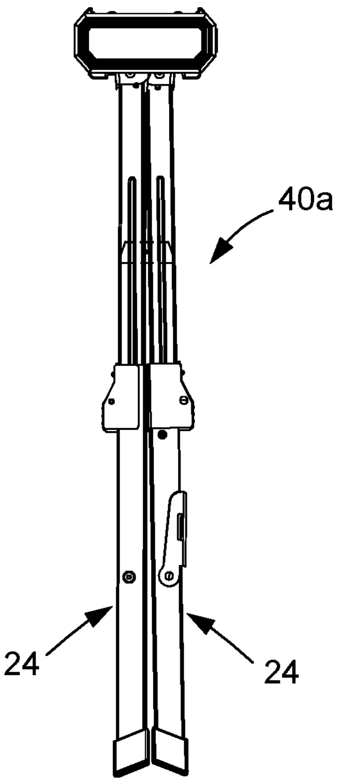
FIG. 5 is a side view of the sawhorse of FIG. 4, and is shown with the legs in a collapsed position.
Figure 10:
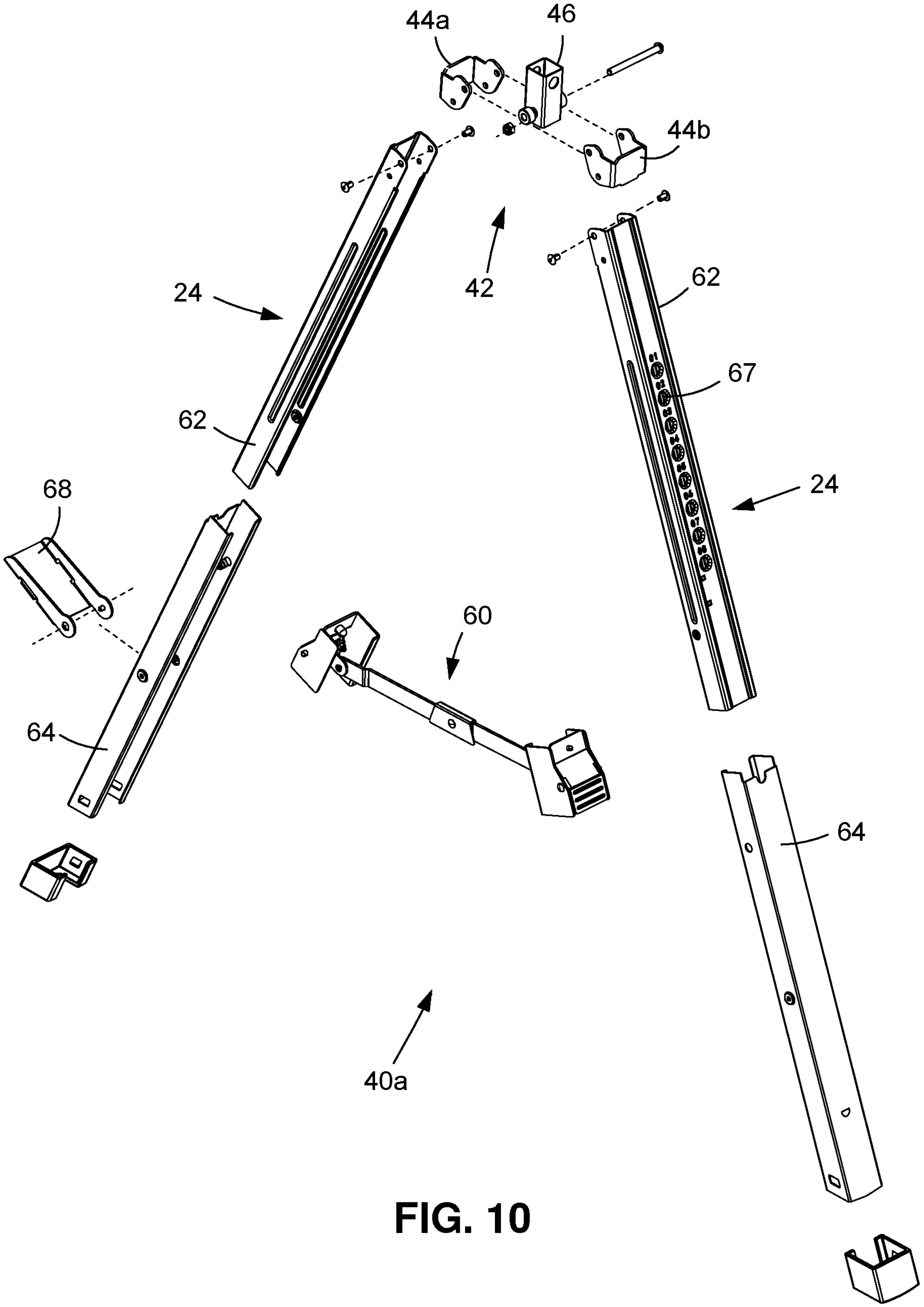
Figure 11:
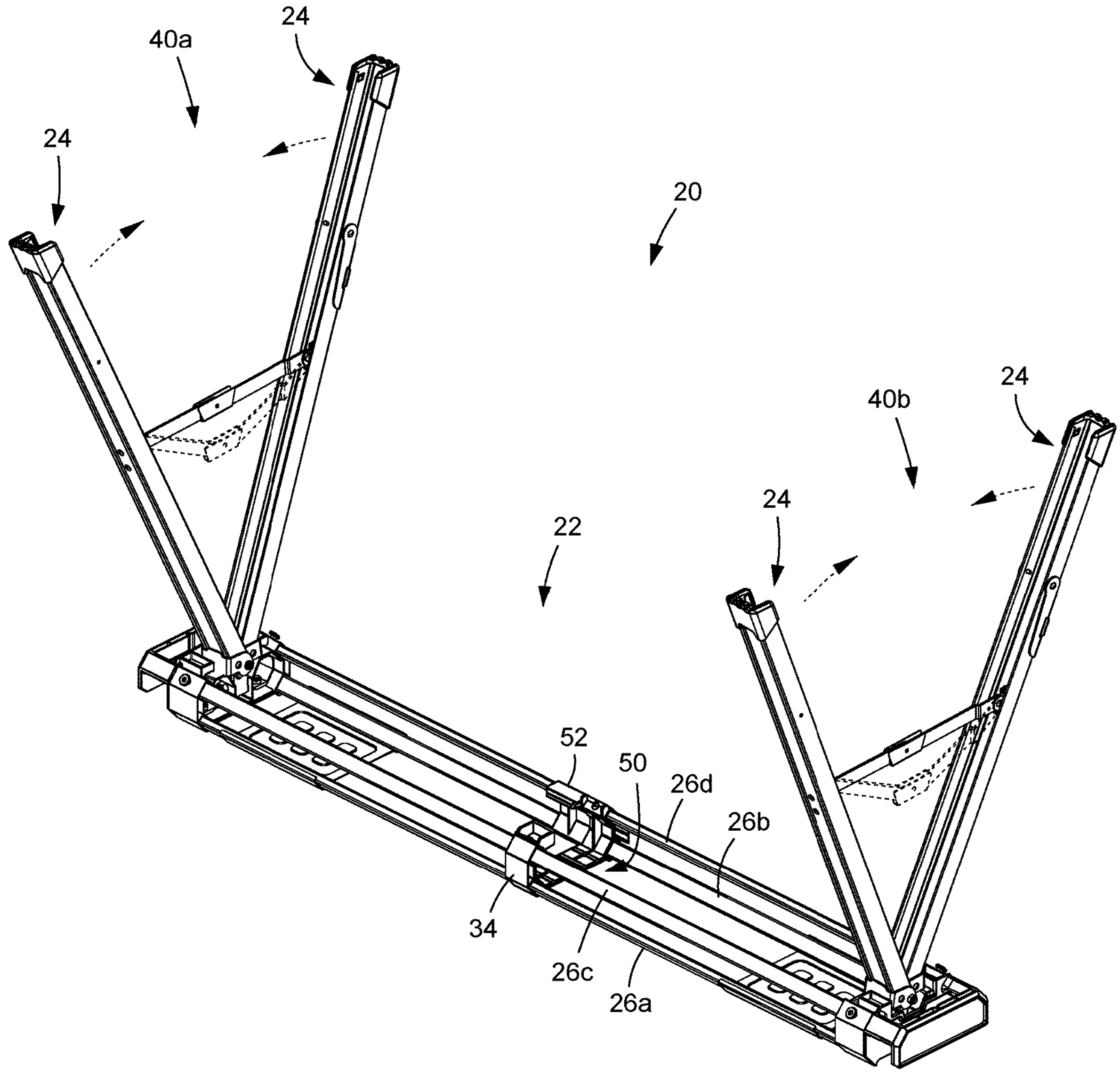
FIG. 11 is a rear isometric view of the sawhorse of FIG. 7, shown with the pairs of hinged legs in an extended position.

The body 22 of the sawhorse 20 is preferably supportable by the one or more legs 24. In one embodiment, the legs 24 comprise first and second pairs of legs 40*a,b*. As best illustrated in FIGS. 10 and 11, the pairs of legs 40*a,b* may comprise first and second legs 24 which are hingedly connected at a top end, such as by a hinge 42 (which may comprise first and second hinge members 44*a,b* which connect to the legs and then are rotatably connect to a hinge mount 46). This allows the first and second legs 24 of each pair of legs 40*a,b* to be moved between an expanded position (such as illustrated in FIG. 4) and a collapsed position (such as illustrated in FIG. 5).

Figure 3:
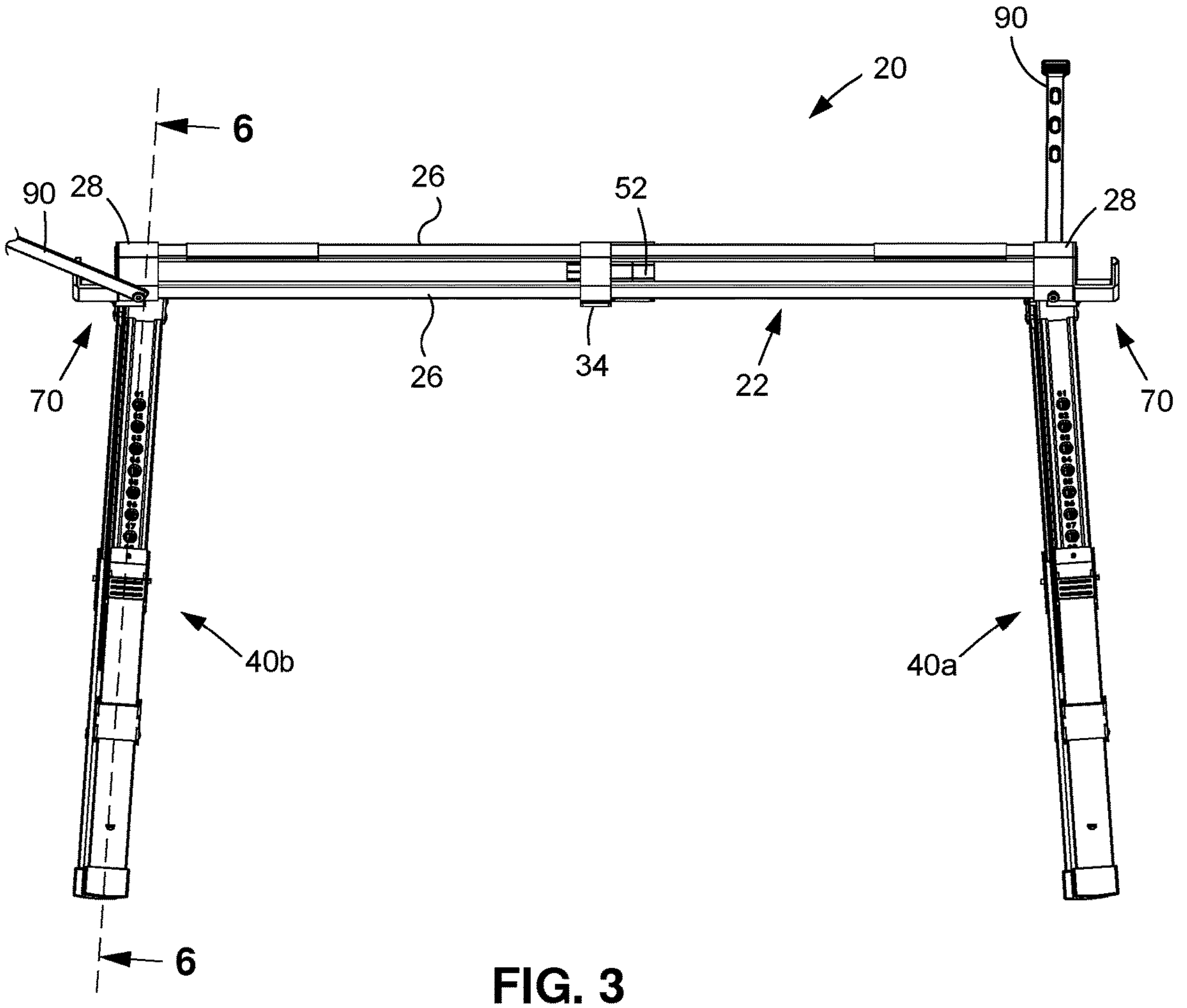

Further, in a preferred embodiment, each pair of legs 40*a,b* may be moved from a stowed position (FIG. 14) to an extended position (FIG. 1), with respect to the body 22. In the stowed position (FIG. 14), the first and second legs 24 of each pairs of legs 40*a,b* is preferably moved to their collapsed position, and the pairs of legs 40*a,b* are then moved to a position in which the pairs of legs 40*a,b* extend generally parallel to the length of the body 22, along the bottom thereof. In the extended position, each pair of legs 40*a,b* extends outwardly from the body 22, such as generally perpendicular to the length thereof, such as illustrated in FIG. 3.

In one embodiment, this is accomplished by movably mounting each pair of legs 40*a,b* to the body 20. For example, as illustrated in FIG. 9, each pair of legs 40*a,b* is connected to a mounting bracket 48. In one embodiment, the hinge mount 46 of each pair of legs 40*a,b* is pivotally connected to one of the mounting brackets 48. The mounting bracket 48 is then connected to one of the end supports 28, such as with one or more fasteners. The mounting permits each pair of legs to pivot about a generally horizontal axis through the body 22.

In one embodiment, when the pairs of legs 40*a,b* are moved to their stowed position, the legs fit into the space between the rails 26 at each side of the body 22. The pairs of legs 40*a,b* may be maintained in the stowed position by one or more leg locks. The leg locks may comprise, for example, a first fixed leg lock 50 which is associated with the central support 34 (see FIG. 1) and a second sliding lock 52 (see FIGS. 1 and 2) which is mounted on one of the rails 26 and is movable therealong. The sliding lock 52 may be moved to a retracted position (away from the central support 34) and the pairs of legs 40*a,b* may be pivoted inwardly to their stowed position.

For example, a first of the pairs of legs 40*a,b* may be moved under the fixed leg lock 50 to capture it (and prevent that pair of legs 40*a,b* from moving outwardly away from the body 22). The second sliding leg lock 52 may then be slid along the rail 26 to engage the second pair of legs 40*a,b*, which at the same time keeps the first pair of legs 40*a,b* under the first leg lock 50. In particular, in one embodiment, the distance between the first and second leg locks 50, 52 is smaller than the width of the pairs of legs 40*a,b* and 40*c,d*, such that once the sliding leg lock 52 is moved into place, neither pair of legs can move between the leg locks and away from the body 22.

Figure 12:
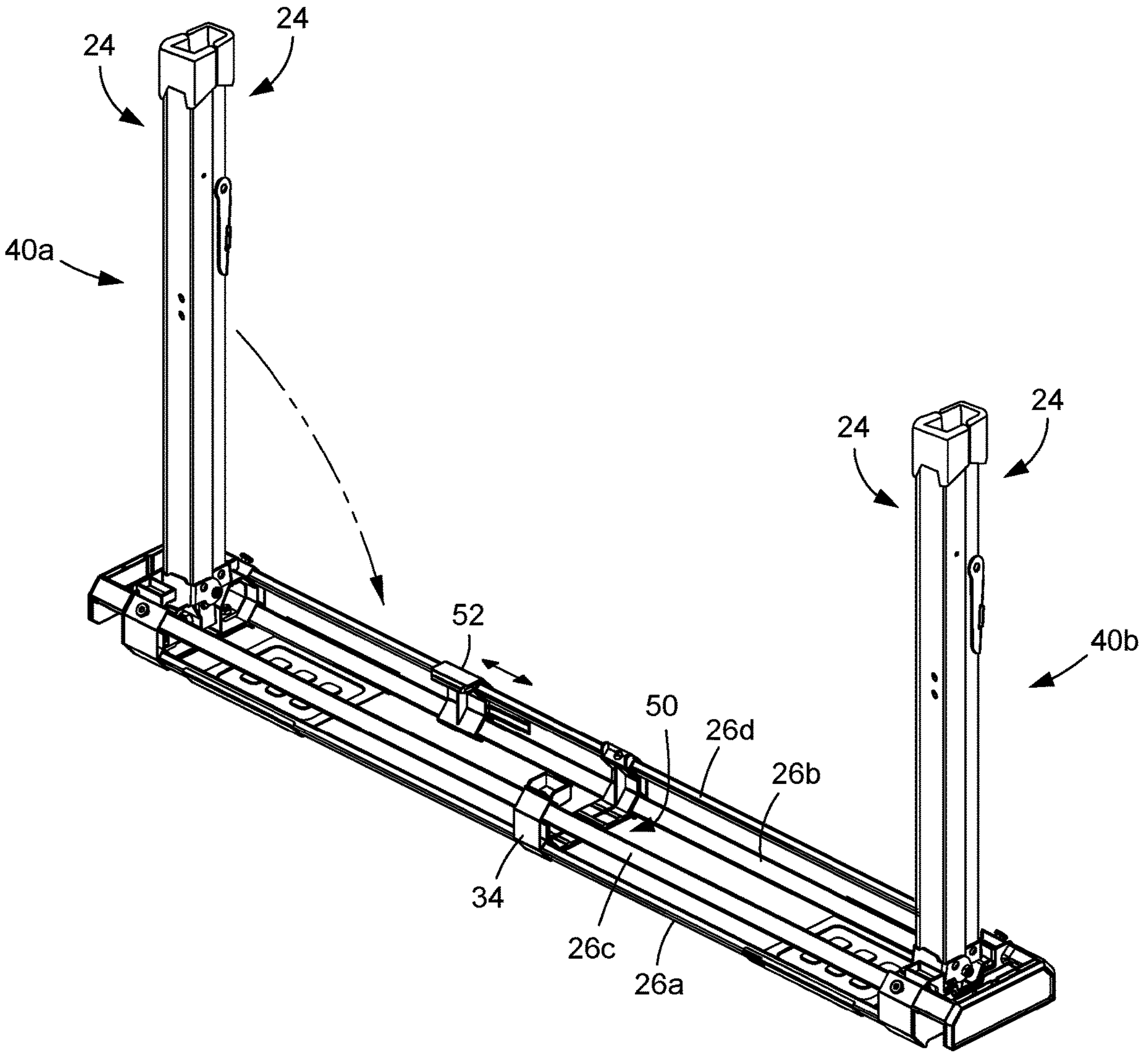
FIG. 12 shows the sawhorse of FIG. 11, shown with the pairs of hinged legs between the extended position and a stowed position.
Figure 13:
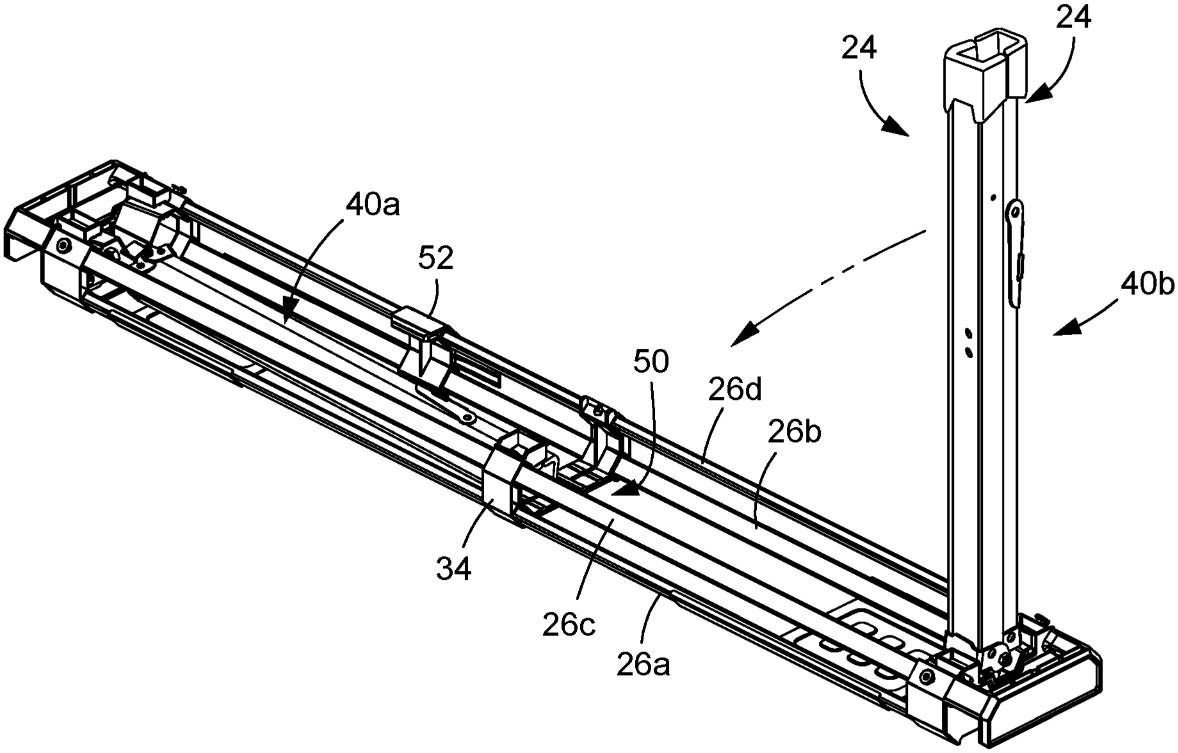
FIG. 13 shows the sawhorse of FIG. 12, shown with one of the pairs of hinged legs in a stowed position.
Figure 14:
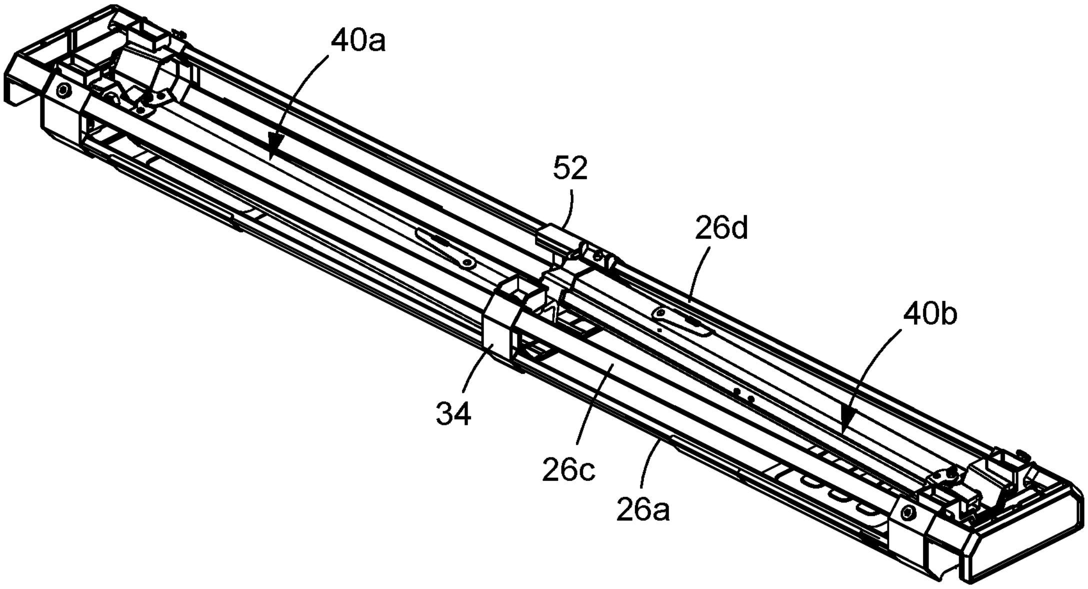
FIG. 14 shows the sawhorse of FIG. 13, shown with both of the pairs of hinged legs in a stowed position.
Figure 15:
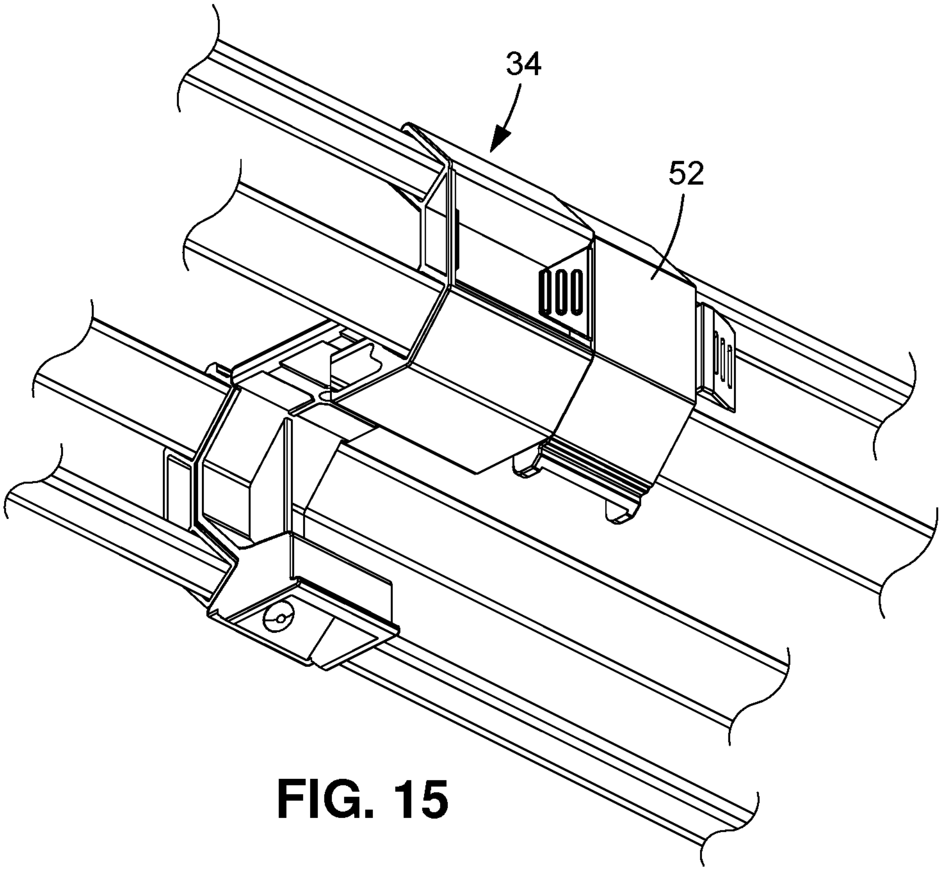
FIG. 15 shows a portion of the sawhorse of FIG. 1.
Figure 16:
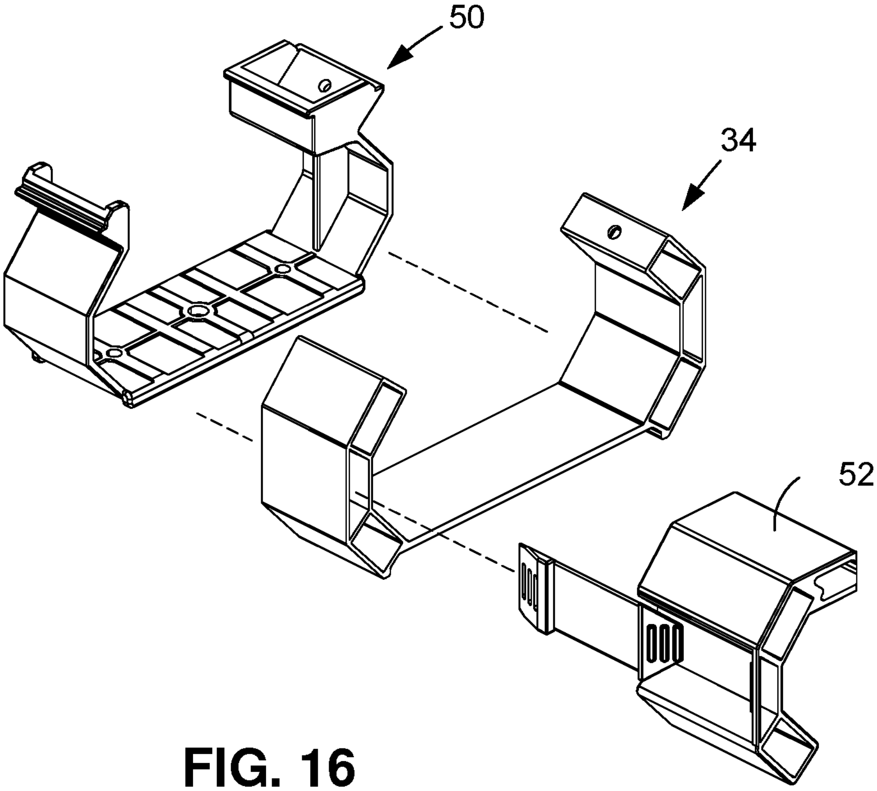
FIG. 16 shows an exploded isometric view of components of the portion of FIG. 15.

See, for example, FIGS. 11-13. As shown, the sliding leg lock 52 is configured to move from a first position (FIG. 11) to a second position (FIGS. 12 and 13). When the sliding leg lock 52 moves from the first position (FIG. 11) toward the second position (FIGS. 12 and 13), the sliding leg lock 52 moves away from the central support 34. Furthermore, it will be appreciated with reference to FIGS. 13 and 14, that the sliding leg lock 52 is configured to be slid along one of the rails 26 to engage the pair of hinged legs 40*a*, in order to keep the pair of hinged legs 40*a* under the fixed leg lock 50. Accordingly, it will be appreciated that the fixed and sliding leg locks 50, 52 are configured to maintain the hinged legs 40*a*, 40*b* in a stowed position (FIG. 14). Additionally, and continuing to refer to FIG. 14, in the stowed position, the first and second pairs of hinged legs 40*a*, 40*b* are each located between the first and second rails 26*a*, 26*b*, and also between the third and fourth rails 26*c*, 26*d*. Moreover, in the stowed position (FIG. 14), the first and second pairs of hinged legs 40*a*, 40*b* each extend generally parallel to a length of the body 22.

The pairs of legs 40*a,b* may have a variety of features. For example, as illustrated, at least one collapsible support 60 (such as comprising first and second struts which are pivotally connected between the legs) may extend between the first and second legs 24 of each pair of legs 40*a,b*, such as to prevent the first and second legs from moving to an over-expanded position under load. The first and second legs of each pair of legs 40*a,b* may also be extendable, such as to change the lengths thereof. In one embodiment, as illustrated in FIGS. 8-10, each leg may comprise a base portion 62 (mounted to the hinge 42) and an extendable portion 64 mounted to the base portion 62. The extendable portion 64 may include a selector 66 (such as a pivoting latch which may be biased to an engaged position and which can be manually moved out of engagement) for selectively engaging the base portion 62, such as at holes 67, slots, etc. of the base portion 62, for releasably maintaining the leg at a desired length. In other words, the selector 66 is configured to extend through each of the plurality of holes 67 in order to releasably maintain each leg 24 at a desired length.

One or more of the legs may also include other features, such as a rotating or pivoting mount 68. The mount 68 might be hingedly or rotatably mounted to the leg 24 so as to be movable between a retracted position in which it extends generally parallel to and along the leg, and an extended position in which it extends outwardly generally perpendicular thereof, thus forming a support (see FIG. 9). For example, a 2×4, second of pipe or other workpiece might be supported by mounts which are moved to their extended positions on one side of the sawhorse 20.

A foot may be located at the free end of each of the extendable portion 64 of each leg. The foot may comprise a protective cap or other member, such as which may be extendable or swivel, such as to provide stability to the sawhorse 20 when it is mounted on an uneven surface.

In one embodiment, as illustrated in FIG. 1, an end cap 70 may be located at each end of the body 20. The end caps 70 may comprise a body which connects to (or is formed as part of) the end support 28, such as by having portions which fit into the openings of the end support 28. The end caps 70 may extend outwardly from the end supports 28 in a direction opposite the rails 26.

In one embodiment, the end caps 70 comprise molded plastic or the like. The end caps 70 may include a flange portion 72, such as which is spaced from another portion of the end cap 70 so as to define a space, such as to create a cord wrap 72 or a workpiece support (such as a channel for accepting a portion of pipe, member or the like). The end caps 70 may include other features, such as a tray, handle, etc. In this regard, different end caps 70 might be provided and might be selectively connected to the end caps 28, such as depending upon the desired functionality thereof.

As shown in FIG. 8, the end cap 70 (e.g., and the other end cap 70 located at the other end of the body 22, not shown in FIG. 8) includes a body portion 71 and a plurality of protrusions 73 extending outwardly from the body portion 71. It will be appreciated that each of the protrusions 73 extends into a corresponding one of the openings 29 of the end support 28 in order to connect the end cap 70 to the end support 28. The end cap 70 and end support 28 at the other end of the body 22 (not shown in FIG. 8) are similarly structured. Of course, other means may be provided for interconnecting the end caps 70 to the end supports 28, such as fasteners, a configuration where protrusions extend from the end supports 28 into engagement with receiving portions of the end caps 70, etc.

In one embodiment, the body 22 of the sawhorse 20 is skeletal in nature (e.g. generally open in the space between the rails 26—both between the rails at opposing sides and between rails on each side). One or more trays 80 or other elements may be selectively located on or be connected to the rails 26 (such as the upper rails 26*a,b*), such as for defining work supporting surfaces, tool/work piece containing areas, etc. (the trays 80 might be generally planar, or might have depressions which extend down into the body 22 between the rails 26, etc.).

Figure 6:
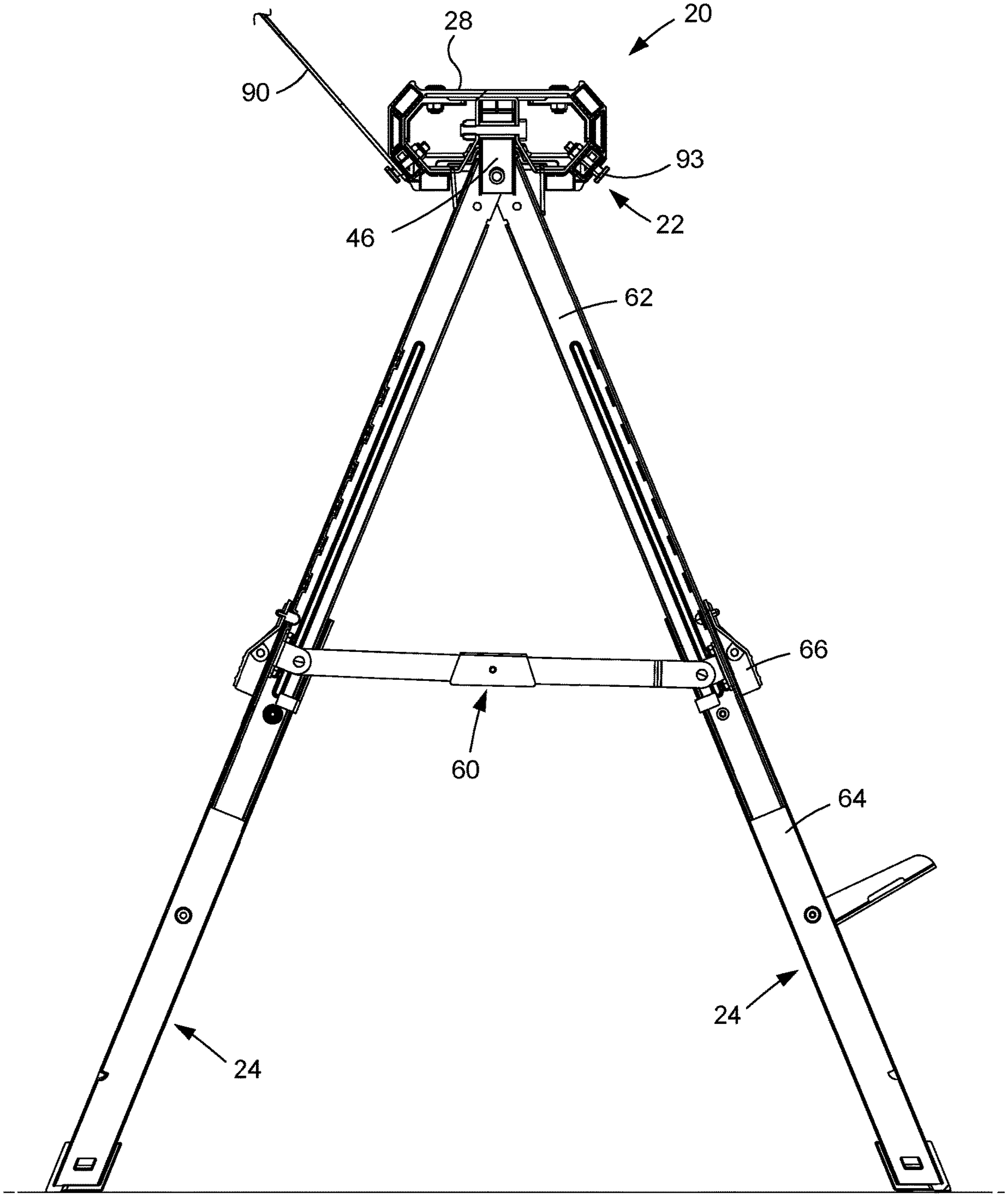
FIG. 6 is another side view of the sawhorse of FIG. 4.

In one embodiment, the sawhorse 20 may include one or more workpiece securing members or elements F46. As one example, the sawhorse 20 may include one or more straps 90. The straps 90 may be associated with the end supports 28, such as for securing a workpiece at one or both ends of the sawhorse 20. The straps 90 may have a first end which is mounted or connected to the end support 28, such as via a fastener (see FIG. 8). The opposing end of each strap 90 might be configured to engage another strap, or the sawhorse 20. For example, as illustrated in FIG. 6, the strap 90 might be extended over the top of the end cap 28 and an associated workpiece thereon, with the free or opposing end of the strap 90 then connected to the end support 28, such as at the opposing side from the first end of the strap 90. In one embodiment, means may be provided for securing the strap 90, such as by one or more openings in the strap 90 which may accept a locking tab 93.

In one embodiment, more than one strap 90 may be provided, such as straps 90 at opposing sides of each end cap 28. Further the straps 90 might have other configurations, such as comprising an elongate element with associated hook and loop fastening material, such as which allows the free end of the strap to be extended over the end cap 28, through a slotted connector, and then looped back onto itself where sections of hook and loop material engage the secure the strap 90. In other embodiments, the straps 90 at opposing sides of the end cap 28 may be configured to be engaged to secure a workpiece, such as where the straps 90 at opposing sides are extended towards one another and are connected.

The sawhorse 20 has a number of advantages and may have other features and configurations.

First, the sawhorse 20 is generally modular, wherein it can be constructed from a number of small individual components into a large structure. The skeletal configuration of the sawhorse 20 and the use of lightweight elements such as extruded end and central supports and tubular rails aids in reducing the weight of the sawhorse 20 (for shipping and use, such as when being moved by a user)—such as compared to conventional sawhorses which have a large solid central body mounted between legs.

The body 22 could also include other intermediate supports, such as placed between the end supports and/or the end supports and a central support, such as for increasing the rigidity and strength of the body 22. In one embodiment, one or more of the rails may extend entirely through such a central or intermediate support (instead of having an end mounted thereto).

In some embodiments, the end and central supports and the rails are constructed from metal. However, plastic covers or the like may be placed over or around those components, such as to protect them (or those members might be coated, etc.).

The use of extruded end and central supports has a number of advantages, aside from weight. In one embodiment the use extruded members allows for single-piece construction with easy "slip to fit" assembly of the rails thereto, which simple connections with fasteners. This reduces the number of fasteners, welding steps, bending tools and overall manufacturing process, resulting in as much as 75% reduction in the number of steps to make the sawhorse 20 as compared to conventional designs.

In one embodiment the top rails 26 define an upper channel therebetween. This channel may be configured to hold a 2×4 to allow a saw to be used on it and not cut into the body.

In one embodiment, the sliding leg lock 52 is held in its locked position (thus locking the pairs of legs 40*a,b* in their stowed position) when the molded tine contacts the central support 34. There may be a protruding static tooth on the opposite side of the sliding leg lock 52 that acts as a secondary leg lock/bracket. The fixed tooth may hold the first pair of legs that is moved to the stowed position. After placing the second pair of legs into the body, the first pair of legs is pushed over and makes contact with the fixed tooth, preventing them from moving.

In one embodiment, the lower rails 26*c,d* may extend though the end supports 28 to provide a support such as a 2×4 (or other workpiece). The free ends of those rails 26*c,d* may then be capped, such as with a plastic molded body. The end of those rails might otherwise have an array of cleats applied to the end to help hold a 2×4 in place, including but not limited to sheet meatal bracket, cast zinc or aluminum parts and so on.

In one embodiment, when the pairs of legs 40*a,b* are stowed, they are located in the body 22 (e.g. between the upper rails 26*a,b* and the lower rails 26*c,d*) and the body 22 is generally planar and elongate. The sawhorse 20 then has a reduced dimension, such as for storage. Further, the sawhorse 20 is then easily stacked on another sawhorse, wherein the molded end cap 70 engages the sawhorse below it, allowing it to be stacked securely without the use of a clip system.

In one embodiment, the tray 80 may comprise a panel (such as a metal panel) may be applied to the top of the body 22 that is used for both storage/work surface as well as add some structural rigidity. The longer the unit the more panels may be applied.

In one embodiment, the overall length of the body 22 is made to fit on to a standard pallet, with an overall length being equal to or less than 40" or 48".

In one embodiment, the sawhorse 20 may be used to support workpieces, tools and the like. For example, miter saw mounting brackets might be connected to the rails 26, thus allowing the sawhorse 20 to be used as a miter saw stand.

The skeletal nature of the body 22 allows it to easily be gripped (such as by grabbing one of the rails 26) for movement.

In one embodiment, not all of the rails need to be attached to the end supports (such as only the lower rails). Further, in some embodiment, a number of rails other than two upper and two lower rails might be used.

Figure 17:
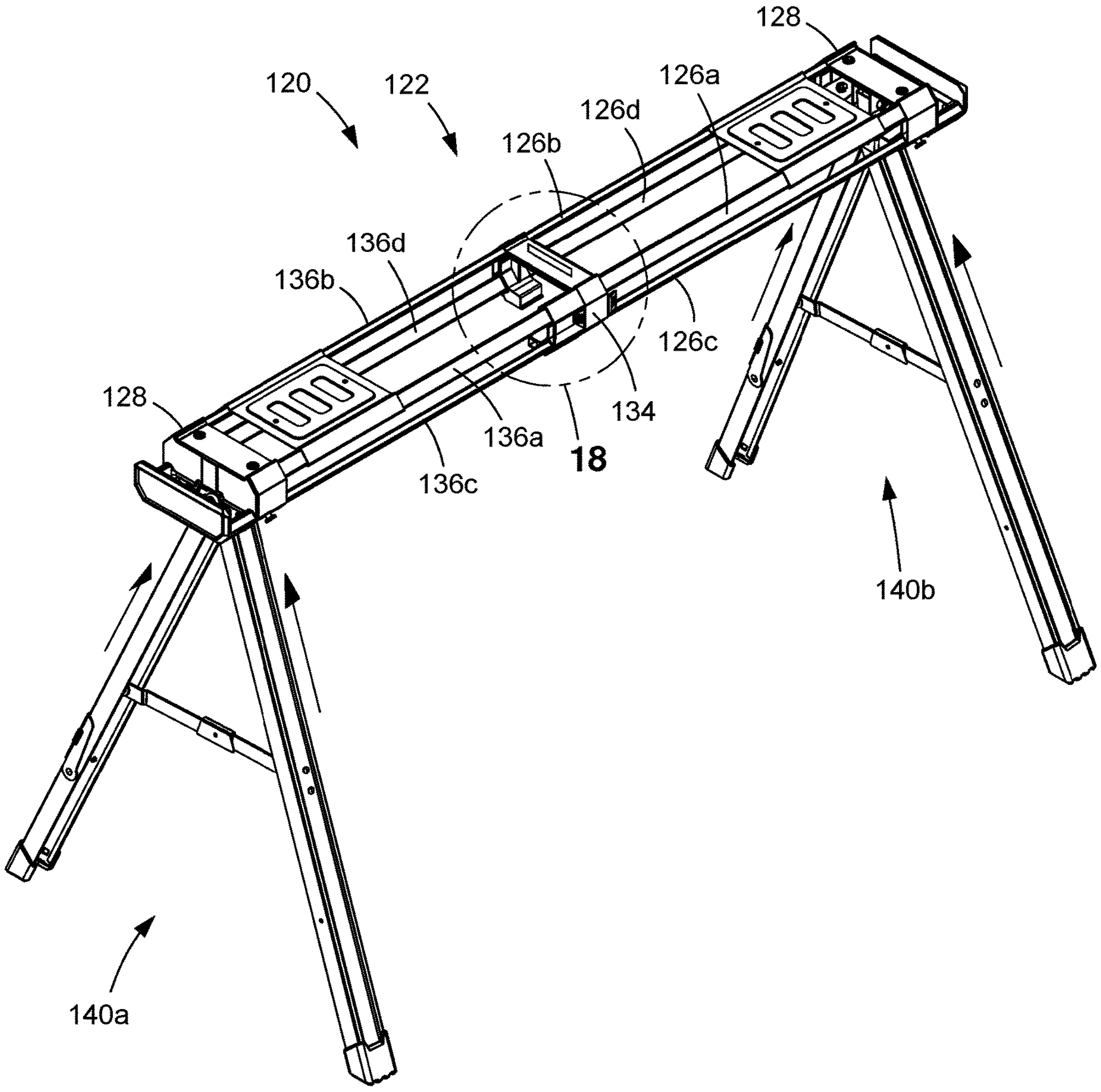
FIG. 17 is a front isometric view of another sawhorse, in accordance with another non-limiting embodiment of the disclosed concept.

FIG. 17 is a front isometric view of another sawhorse 120, in accordance with another non-limiting embodiment of the disclosed concept. The sawhorse 120 includes a body 122, and first and second pairs of legs 140*a*, 140*b* pivotally connected to the body 122. The body 122 includes first and second end supports 128, a central support 134 located between the first and second end supports 128, and a plurality of rails 126*a-d*, 136*a-d*. In one example, the central support 134 and the first and second end supports 128 are structured the same. In the example of FIG. 17, the plurality of rails 126*a-d*, 136*a-d* includes a first plurality of rails 126*a-d* extending between the first end support 128 and the central support 134, and a second plurality of rails 136*a-d* extending between the second end support 128 and the central support 134.

Figure 18:
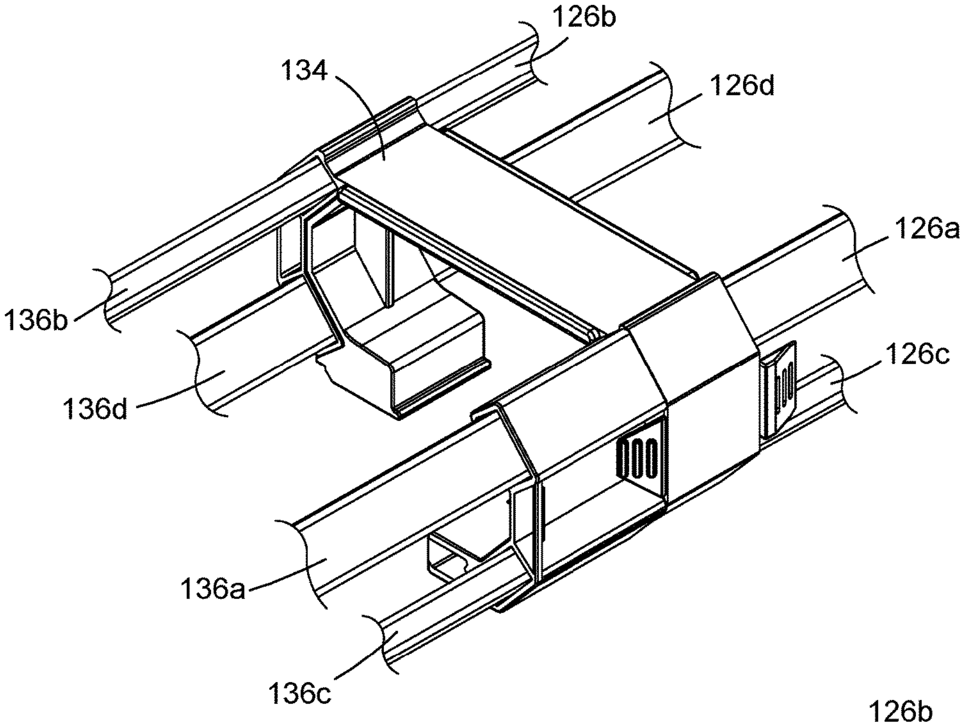
FIG. 18 is an enlarged view of a portion of the sawhorse of FIG. 17.
Figure 19:
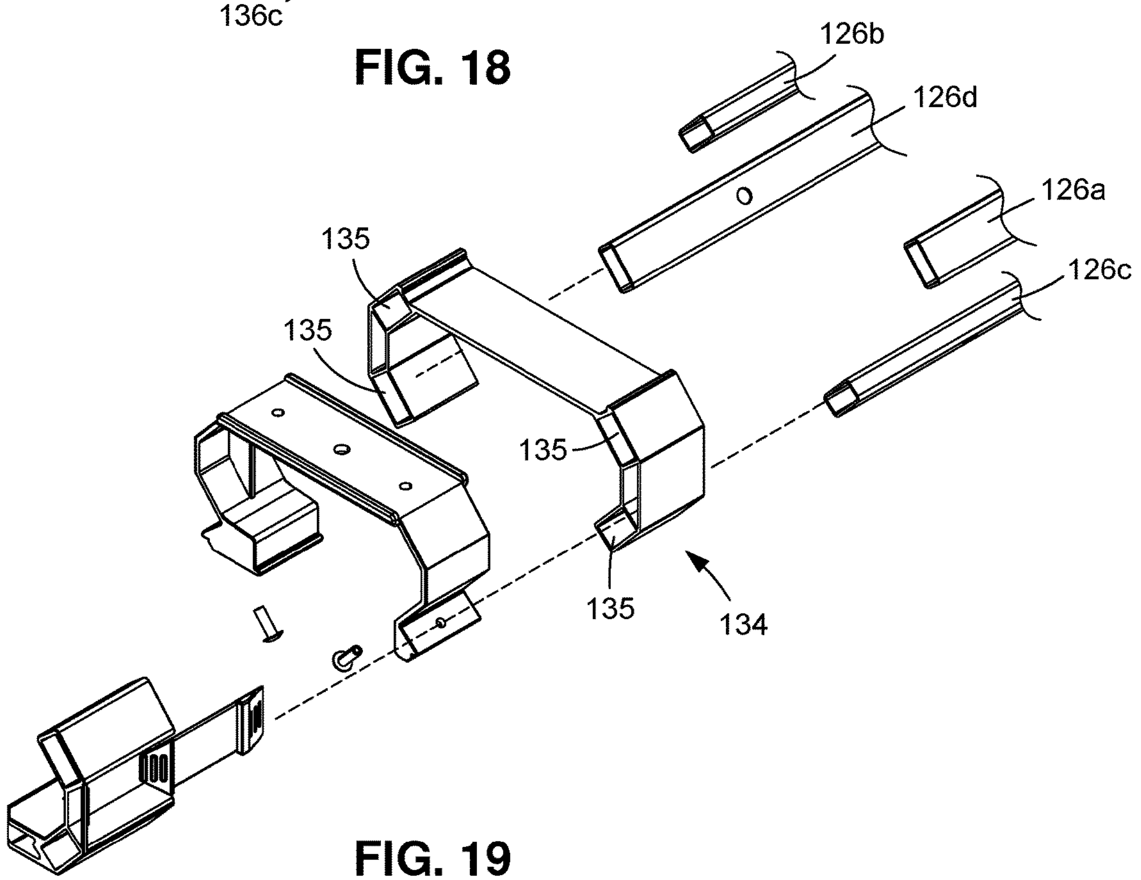
FIG. 19 is an exploded isometric view of components of the portion of FIG. 18.

FIG. 18 shows an enlarged view of the central support of FIG. 17, and FIG. 19 shows an exploded view of a portion of FIG. 18. As shown in FIG. 19, the central support 134 has a plurality of openings 135 for receiving the first plurality of rails 126*a-d*. The openings 135 are also configured to receive the second plurality of rails 136*a-d* (not shown in FIG. 19, but see FIGS. 17 and 18). Accordingly, it will be appreciated that each of the first plurality of rails 126*a-d* and the second plurality of rails 136*a-d* are detachably coupled to the central support 134 and a corresponding one of the first and second end supports 128. In this manner, the sawhorse 120 may be stowed in a relatively portable manner, wherein a length of the sawhorse may be halved by detaching one of the pairs of rails 126*a-d*, 136*a-d* from the central support 134. Of course, this principle might be applied to a sawhorse 120 with more than one central support 134, such as where the sawhorse 120 is effectively divided into 3 or 4 sections, thus reducing the total length of the rails of each section.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, one skilled in the art will recognize such feature, structure, or characteristic in connection with other embodiments whether or not explicitly described.

It should also be understood that the word "example" as used herein is intended to be non-exclusionary and non-limiting in nature. More particularly, the word "example" as used herein indicates one among several examples, and it should be understood that no undue emphasis or preference is being directed to the particular example being described.

With regard to the methods described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating various embodiments and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

What is claimed is:

1. A sawhorse comprising:

a body comprising:

a first end support, a second end support, and a plurality of rails extending between said first and second end supports;

a first pair of hinged legs pivotally connected to said body;

a second pair of hinged legs pivotally connected to said body;

a central support coupled to each of the first rail and the second rail and disposed between the first end support and the second end support, a fixed leg lock associated with the central support, and a sliding leg lock mounted to the first rail and a being movable therealong, wherein the first pair of hinged legs and the second pair of hinged legs are each configured to move from a stowed position to an extended position, with respect to said body, wherein, in the stowed position, the first pair of hinged legs and the second pair of hinged legs each extend generally parallel to a length of the body, and wherein in the extended position, the first pair of hinged legs and the second pair of hinged legs each extend outwardly from the body, and wherein the fixed and sliding leg locks are configured to maintain the first pair of hinged legs and the second pair of hinged legs in the stowed position.

2. The sawhorse according to claim 1, wherein the plurality of rails comprises a first rail and a second rail disposed opposite and parallel to the first rail, and wherein, in the stowed position, the first pair of hinged legs and the second pair of hinged legs are each disposed between the first rail and the second rail.

3. The sawhorse according to claim 1, wherein the sliding leg lock is configured to be moved from a first position to a second position, wherein, when the sliding leg lock moves from the first position toward the second position, the sliding leg lock moves away from the central support, and wherein the sliding leg lock is configured to be slid along the first rail to engage the second pair of hinged legs in order to keep the first pair of hinged legs under the fixed leg lock.

4. The sawhorse according to claim 1, wherein each leg of the first pair of hinged legs and the second pair of hinged legs comprises a base portion and an extendable portion mounted to the base portion.

5. The sawhorse according to claim 4, wherein the extendable portion comprises a selector for selectively engaging the base portion in order to releasably maintain said each leg at a desired length.

6. The sawhorse according to claim 5, wherein the base portion has a plurality of holes, and wherein the selector is configured to extend through each of the plurality of holes in order to releasably maintain said each leg at the desired length.

7. The sawhorse according to claim 1, wherein the first pair of hinged legs and the second pair of hinged legs each comprise a first leg, a second leg, and a collapsible support extending between the first and second legs in order to prevent the first and second legs from moving to an over-expanded position when subjected to a load.

8. The sawhorse according to claim 1, further comprising a first mounting bracket and a second mounting bracket, wherein the first mounting bracket is connected to the first end support and each leg of the first pair of hinged legs in order to allow each leg of the first pair of hinged legs to pivot about a generally horizontal axis through the body, and wherein the second mounting bracket is connected to the second end support and each leg of the second pair of hinged legs in order to allow each leg of the second pair of hinged legs to pivot about the generally horizontal axis.

9. The sawhorse according to claim 8, further comprising a first hinge mount, a first pair of hinge members, a second hinge mount, and a second pair of hinge members, wherein the first pair of hinge members are each connected to each of the first pair of hinged legs and rotatably connected to the first hinge mount, and wherein the second pair of hinge members are each connected to each of the second pair of hinged legs and rotatably connected to the second hinge mount.

10. The sawhorse according to claim 1, wherein the plurality of rails comprises a pair of lower rails and a pair of upper rails each extending between the first and second end supports and defining a corresponding lower channel and a corresponding upper channel.

11. The sawhorse according to claim 10, wherein each rail of the pair of lower rails and the pair of upper rails comprises an end configured to be slid into a corresponding opening of a corresponding one of the first and second end supports.

12. The sawhorse according to claim 1, further comprising a first end cap and a second end cap each connected to a corresponding one of the first and second end supports, and each defining a corresponding channel for accepting a member.

13. The sawhorse according to claim 12, wherein each of the first end cap and the second end cap comprises a plurality of protrusions, wherein each of the first and second end supports has a plurality of openings, wherein each of the protrusions of the first end cap extends into a corresponding one of the openings of the first end support in order to connect the first end cap to the first end support, and wherein each of the protrusions of the second end cap extends into a corresponding one of the openings of the second end support in order to connect the second end cap to the second end support.

14. The sawhorse according to claim 13, wherein at least one of the plurality of rails extends through each of the first end support and the second end support in order to provide support to the first and second end supports.

* * * * *